R. I. FANCHER.
LOOSE PULLEY.
APPLICATION FILED MAY 3, 1910.

1,022,779.

Patented Apr. 9, 1912.

WITNESSES
R. W. Bailey.
H. E. Chase.

INVENTOR
R. I. Fancher
BY
Howard P. Denison
ATTORNEY.

UNITED STATES PATENT OFFICE.

ROSMAN I. FANCHER, OF BALDWINSVILLE, NEW YORK, ASSIGNOR OF ONE-HALF TO FRANK L. FULLER, OF SYRACUSE, NEW YORK.

LOOSE PULLEY.

1,022,779. Specification of Letters Patent. Patented Apr. 9, 1912.

Application filed May 3, 1910. Serial No. 559,190.

*To all whom it may concern:*

Be it known that I, ROSMAN I. FANCHER, of Baldwinsville, in the county of Onondaga, in the State of New York, have invented new and useful Improvements in Loose Pulleys, of which the following, taken in connection with the accompanying drawings, is a full, clear, and exact description.

This invention relates to certain improvements in bearings for loose pulleys as associated with a shaft and a tight pulley mounted thereon.

One of the objects is to support the loose pulley apart from the shaft, so as to avoid excessive wear or mutilation of said shaft and at the same time to form an intervening oil chamber for the reception and retention of a lubricant for the bearing.

Another object is to provide the loose pulley with a removable journal or central sleeve of considerable length and extending some distance beyond the ends of the face of the pulley where it is journaled in separate bearings which are secured to the shaft at opposite ends of the sleeve.

A further object is to enlarge the oil chamber substantially midway between its ends, so that the centrifugal force of the lubricant during the rotation of the pulley will cause such lubricant to be concentrated from the ends toward the center.

A still further object is to provide the oil chamber with a sleeve of absorbent material, as felt, capable of retaining by saturation a considerable quantity of the oil or lubricant and sufficiently flexible, so as to respond to the centrifugal force caused by the rotation of the pulley to press against the sides of the oil chamber and thereby liberate part of its lubricant by compression of the absorbent material and allow such lubricant to pass by capillary attraction to the bearings.

A still further object is to provide suitable oil absorbent rings or washers at the ends of the bearing sleeve for the loose pulley to prevent the escape of the oil from the bearings.

Figure 1:
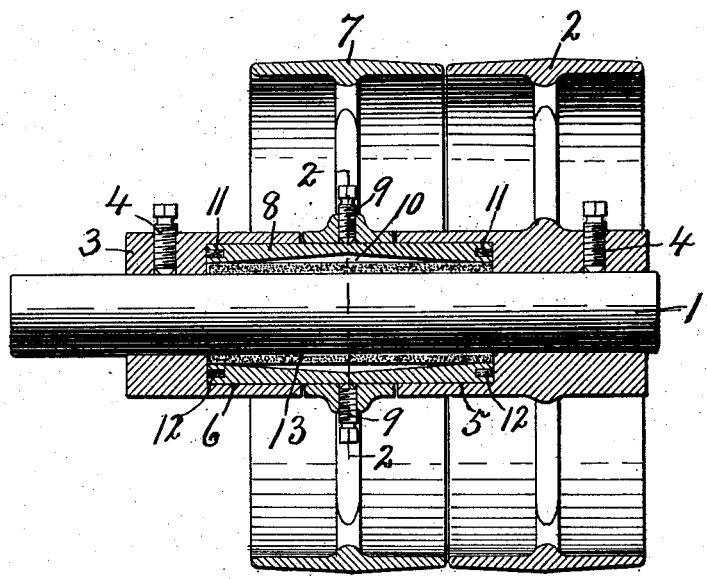
Figure 2:
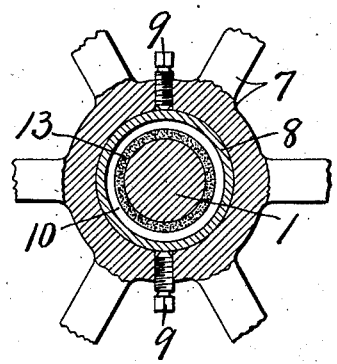
Figure 3:
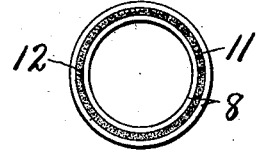

Other objects and uses will be brought out in the following description.
In the drawings: Figure 1 is a longitudinal sectional view of a tight and loose pulley and my improved journal bearing for the loose pulley in connection with a shaft. Fig. 2 is a transverse sectional view taken on line 2—2, Fig. 1. Fig. 3 is an end view of the detached sleeve or journal for the loose pulley.

In illustrating the operation of my invention, I have shown a shaft —1— upon which is mounted a tight pulley —2— and a coaxial collar —3—, said tight pulley and collar being adjustably secured to the shaft by any suitable fastening means, as set screws —4—. The adjacent ends of the hub of the tight pulley —2— and collar —3— are spaced some distance apart and are provided with central cylindrical sockets —5— and —6— of somewhat greater diameter than that of the shaft —1— and consisting of bearings for a loose pulley —7—. This loose pulley is provided with a central tubular sleeve or journal —8— of somewhat greater length than the face width of the pulley to afford as long a bearing as possible and having its ends journaled in the bearings or sockets —5— and —6—, said sleeve being secured to the loose pulley by one or more set screws —9— which when loosened permit the sleeve to be removed and replaced by a new one, if necessary. The interior diameter of the sleeve is somewhat greater than that of the shaft —1— to form an intervening oil chamber —10— which in this instance gradually increases in diameter from the ends toward the center, so that the diameter of the oil chamber intermediate the ends of the sleeve or journal is largest, to cause the oil to concentrate from the ends toward the center under centrifugal force produced by the rotation of the pulley, thereby preventing such oil from being forced outwardly around the ends of the sleeve by such force. As a further means for preventing the escape of the oil from the bearings, the ends of the sleeve —8— are provided with annular recesses —11— in which are inserted flexible washers or packing rings —12— of absorbent material capable of absorbing any excessive quantity of oil which may find its way to the ends of the sleeve when the pulley is at rest and at the same time supplying the lubricant to the endthrust bearings as well as to the peripheral bearings, such oil being drawn into the joints or contacting surfaces of the bearings by capillary attraction.

Within the oil chamber —10— of the sleeve or journal —8— and surrounding the adjacent portion of the shaft —1— is a flexible sleeve —13— of absorbent material such as felt which extends from end to end of said oil chamber and sleeve, for the purpose of absorbing and retaining the greater part of the oil in said chamber. The outer diameter of the absorbent sleeve —13— is substantially the same from end to end and adapted to fit into opposite ends of the oil chamber, leaving its intermediate portion free to expand into the enlargement of the oil chamber under centrifugal force produced by the rotation of the pulley. This absorbent sleeve not only aids in preventing the escape of oil from the bearings, but also affords a more even distribution to such bearings, and at the same time automatically gives up its oil in proportion to the speed of rotation of the pulley, by reason of the fact that under such rotation the central portion of the sleeve is pressed outwardly by centrifugal force against the walls of the oil chamber, thereby expelling the oil therefrom and allowing such oil to flow by capillary attraction to the bearings. On the other hand when the pulley is at rest any oil which may remain in the chamber —10— is readily taken up by the absorbent sleeve —13— and also by the absorbent rings —12— and is prevented from escaping through the running joints of the bearings.

In some instances the absorbent sleeve —13— may be dispensed with and the oil chamber —10— filled with a lubricant which would be prevented from escaping from the bearings when the pulley is at rest by the absorbent rings —12—, while on the other hand during the rotation of the pulley the body of oil would be concentrated by centrifugal force from the ends into the central enlargement of the oil chamber —10—, it being understood that under all conditions a limited quantity of oil would be fed by capillary force into the joints of the bearings.

The absorbent sleeve —13— is, however, important in retaining the greater quantity of the oil and more evenly distributing the same to the ends and peripheral bearings of the sleeve, and at the same time owing to its flexibility is susceptible to more or less compression against the walls of the oil chamber by centrifugal force to express the oil therefrom in quantities proportionate to the speed of the pulley.

What I claim is:

In combination with a shaft, a pulley and a collar both tight on the shaft and having their adjacent ends provided with sockets of greater diameter than the shaft, a sleeve having its opposite ends journaled in the sockets and provided with a central opening of greater diameter than the shaft forming an oil chamber, a flexible sleeve of absorbent material within the oil chamber, a loose pulley secured to the sleeve and packing rings in the ends of the first named sleeve.

In witness whereof I have hereunto set my hand on this 29th day of April 1910.

ROSMAN I. FANCHER.

Witnesses:
H. E. CHASE,
A. L. HUMPHREY.

Copies of this patent may be obtained for five cents each, by addressing the "Commissioner of Patents, Washington, D. C."